US010552986B1

(12) United States Patent
Arkhipau et al.

(10) Patent No.: US 10,552,986 B1
(45) Date of Patent: Feb. 4, 2020

(54) COMPUTER SYSTEMS AND COMPUTER-IMPLEMENTED METHODS CONFIGURED TO TRACK MULTIPLE EYE-GAZE AND HEARTRATE RELATED PARAMETERS DURING USERS' INTERACTION WITH ELECTRONIC COMPUTING DEVICES

(71) Applicant: Banuba Limited, Wan Chai (HK)

(72) Inventors: Viachaslau Arkhipau, Minsk (BY);
Yury Hushchyn, Wan Chai (HK);
Aliaksei Sakolski, Minsk (BY);
Dzmitry Kachatkou, Minsk (BY)

(73) Assignee: Banuba Limited, Wan Chai (HK)

( * ) Notice: Subject to any disclaimer, the term of this patent is extended or adjusted under 35 U.S.C. 154(b) by 0 days.

(21) Appl. No.: 16/516,042

(22) Filed: Jul. 18, 2019

Related U.S. Application Data

(60) Provisional application No. 62/701,106, filed on Jul. 20, 2018.

(51) Int. Cl.
*G06K 9/00* (2006.01)
*G06T 7/90* (2017.01)
(Continued)

(52) U.S. Cl.
CPC .............. *G06T 7/90* (2017.01); *G06F 3/011* (2013.01); *G06K 9/00221* (2013.01);
(Continued)

(58) Field of Classification Search
CPC ..... A61B 5/0077; A61B 5/1032; A61B 5/024; A61B 5/7257; A61B 5/02405;
(Continued)

(56) References Cited

U.S. PATENT DOCUMENTS 9,182,819 B2    11/2015  Strupczewski et al.
9,411,417 B2    8/2016   Arar et al.
(Continued)

OTHER PUBLICATIONS

Lueangwattana, Chanya, Toshiaki Kondo, and Hideaki Haneishi. "A comparative study of video signals for non-contact heart rate measurement." 2015 12th International Conference on Electrical Engineering/Electronics, Computer, Telecommunications and Information Technology (ECTI-CON). IEEE, 2015. (Year: 2015).*

(Continued)

*Primary Examiner* — Li Liu
(74) *Attorney, Agent, or Firm* — Greenberg Traurig, LLP (57) ABSTRACT

Embodiments of the present disclosure include receiving a sequence of images of a face of a user. A three-dimensional (3D) model of the face is generated and 3D facial points associated with flat facial surfaces are determined. The 3D facial points are projected onto a screen coordinate plane to produce a two-dimensional (2D) facial points. A hue is determined for each pixel associated with each of the 2D facial points in each image. A mean hue value is determined for each image. A spectral representation of a variation in each mean hue value across the sequence of images is determined. A frequency of a main hue is determined based on a largest weight of the variation in each mean hue value. A heart rate of the user is determined based on facial blood circulation according to the frequency of the main hue, and an activity recommendation is displayed.

20 Claims, 7 Drawing Sheets

(51) Int. Cl.
*G06T 7/00* (2017.01)
*G06F 3/01* (2006.01)
*G06T 17/20* (2006.01)

(52) U.S. Cl.
CPC .......... *G06T 7/0012* (2013.01); *G06T 17/20* (2013.01); *G06T 2207/10016* (2013.01)

(58) Field of Classification Search
CPC .......... G06T 2207/30088; G06T 2207/30201; G06K 2009/00939
See application file for complete search history.

(56) References Cited

U.S. PATENT DOCUMENTS

| | | | | |
|---|---|---|---|---|
| 2013/0096439 | A1* | 4/2013 | Lee | A61B 5/024 600/479 |
| 2015/0031965 | A1* | 1/2015 | Visvanathan | A61B 5/0059 600/301 |
| 2016/0066835 | A1* | 3/2016 | He | A61B 5/6898 482/4 |
| 2016/0106329 | A1* | 4/2016 | Hoof | A61B 5/0261 600/479 |
| 2019/0125197 | A1* | 5/2019 | Fukuda | A61B 5/0077 |
| 2019/0239762 | A1* | 8/2019 | Tsouri | A61B 5/0022 |
| 2019/0266388 | A1* | 8/2019 | Kolagunda | G06K 9/00906 |

OTHER PUBLICATIONS

Tsouri, Gill R., and Zheng Li. "On the benefits of alternative color spaces for noncontact heart rate measurements using standard red-green-blue cameras." Journal of biomedical optics 20.4 (2015): 048002. (Year: 2015).*

Bousefsaf, Frédéric, Choubeila Maaoui, and Alain Pruski. "Continuous wavelet filtering on webcam photoplethysmographic signals to remotely assess the instantaneous heart rate." Biomedical Signal Processing and Control 8.6 (2013): 568-574. (Year: 2013).*

Sanyal, Shourjya, and Koushik Kumar Nundy. "Algorithms for monitoring heart rate and respiratory rate from the video of a user's face." IEEE journal of translational engineering in health and medicine 6 (2018): 1-11. (Year: 2018).*

Al-Rahayfeh, Amer et al., "Classifiers Comparison for a New Eye Gaze Direction Classification System", 978-1-4577-1343-9/12, 2014 IEEE (6 pages).

* cited by examiner

400
RESULTS OF
EYE SEGMENTATION

401
ORIGINAL IMAGE

402
EYE SEGMENTATION

FIG. 4

500
EXAMPLE OF
EYE SEGMENTATION DATASET

COMPUTER SYSTEMS AND COMPUTER-IMPLEMENTED METHODS CONFIGURED TO TRACK MULTIPLE EYE-GAZE AND HEARTRATE RELATED PARAMETERS DURING USERS' INTERACTION WITH ELECTRONIC COMPUTING DEVICES

CROSS-REFERENCE TO RELATED APPLICATIONS

This application claims priority to U.S. Provisional Application No. 62/701,106, entitled "COMPUTER SYSTEMS AND COMPUTER-IMPLEMENTED METHODS CONFIGURED TO TRACK NUMEROUS USER-RELATED PARAMETERS DURING USERS' INTERACTION WITH ELECTRONIC COMPUTING DEVICES", filed on Jul. 20, 2018, incorporated herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Banuba Limited, All Rights Reserved.

FIELD OF TECHNOLOGY

The present disclosure generally relates to improved computer-based systems for one or more novel technological applications of real-time heart rate and heart rate variability estimation from portrait images.

BACKGROUND OF TECHNOLOGY

A computer network system may include a group of computers (e.g., clients, servers, smart routers) and other computing hardware devices that are linked together through one or more communication channels to facilitate communication and/or resource-sharing, via one or more specifically programmed graphical user interfaces (GUIs) of the present disclosure, among a wide range of users. However, monitoring and recognizing user behaviors related to use of the systems and computers typically requires external devices and personnel.

SUMMARY OF DESCRIBED SUBJECT MATTER

In some embodiments, the present disclosure provides an exemplary technically improved computer-based method that includes at least the following steps of receiving, by at least one processor, a sequence of images of a face of a user from at least one image capture device. The at least one processor generates a three-dimensional (3D) model of the face in the sequence of images according to a face recognition algorithm. The at least one processor determines a plurality of 3D facial points associated with one or more flat facial surfaces on the 3D model of the face. The at least one processor projects the plurality of 3D facial points onto a screen coordinate plane to produce a plurality of two-dimensional (2D) facial points, where the screen coordinate plane includes a set of coordinates relative to a screen in communication with the processor. The at least one processor determines a hue of each pixel associated with each of the plurality of 2D facial points in each image of the sequence of images. The at least one processor determines a mean hue value associated with the face based on an averaging of the hue of each pixel of each of the plurality of 2D facial points in each image of the sequence of images, where the mean hue value is determined with a moving window. The at least one processor determines a spectral representation of a variation in the mean hue value across the sequence of images. The at least one processor determines a frequency of a main hue based on a largest weight of the variation in the mean hue value for each of the plurality of 2D facial points in each image of the sequence of images. The at least one processor determines a heart rate of the user based on a blood circulation to facial blood vessels according to the frequency of the main hue, and the at least one processor causes to display at a screen of a computing device at least one activity recommendation based at least in part on the heart rate.

In some embodiments, the present disclosure provides an exemplary technically improved computer-based method that includes at least the following steps of receiving, by at least one memory device, a sequence of images of a face of a user from an image capture device. The at least one processor generates a three-dimensional (3D) model of the face in the sequence of images according to a face recognition algorithm. The at least one processor determines a plurality of 3D facial points associated with one or more flat facial surfaces on the 3D model of the face. The at least one processor projects the plurality of 3D facial points onto a screen coordinate plane to produce a plurality of two-dimensional (2D) facial points, where the screen coordinate plane includes a set of coordinates relative to a screen in communication with the processor. The at least one processor determines a hue of each pixel associated with each of the plurality of 2D facial points in each image of the sequence of images. The at least one processor determines a mean hue value associated with each of the plurality of 2D facial points in each image of the sequence of images, where the mean hue value is determined with a moving window. The at least one processor determines a spectral representation of a variation in the mean hue value for each of the plurality of 2D facial points across the sequence of images. The at least one processor determines a frequency of a main hue based on a largest weight of the variation in the mean hue value for each of the plurality of 2D facial points across the sequence of images. The at least one processor determines a heart rate based blood circulation to facial blood vessels according to the frequency of the main hue. The at least one processor determines a phase of the heart rate based on the frequency of the main hue. The at least one processor determines an average period of the heart rate. The at least one processor determines phase differences based on a change in the phase across the sequence of images. The at least one processor determines an absolute difference from the average period based on the phase differences to estimate heart rate variability of the user, and causes to display with a screen an activity recommendation based at least on the heart rate variability.

In some embodiments, the present disclosure provides an exemplary technically improved computer-based system that includes at least the following components of a memory device, a video capture device, and a processing device. The processing device is configured to perform instructions stored in the memory device, the instructions including: receiving, by a memory device, a sequence of images of a face of a user from an image capture device, generating, by a processor, a three-dimensional (3D) model of the face in the sequence of images according to a face recognition algorithm, determining a plurality of 3D facial points associated with one or more flat facial surfaces on the 3D model of the face, projecting the plurality of 3D facial points onto a screen coordinate plane to produce a plurality of two-dimensional (2D) facial points, where the screen coordinate plane includes a set of coordinates relative to a screen in communication with the processor, determining a hue of each pixel associated with each of the plurality of 2D facial points in each image of the sequence of images, determining a mean hue value associated with each of the plurality of 2D facial points in each image of the sequence of images, where the mean hue value is determined with a moving window, determining a spectral representation of a variation in the mean hue value for each of the plurality of 2D facial points across the sequence of images, determining a frequency of a main hue based on a largest weight of the variation in the mean hue value for each of the plurality of 2D facial points across the sequence of images, determining a heart rate based blood circulation to facial blood vessels according to the frequency of the main hue, determining a phase of the heart rate based on the frequency of the main hue, determining an average period of the heart rate, determining phase differences based on a change in the phase across the sequence of images, determining an absolute difference from the average period based on the phase differences to estimate heart rate variability of the user, and causing to display with a screen an activity recommendation based at least on the heart rate variability.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DESCRIPTION OF ILLUSTRATIVE EXAMPLES

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention. Further, when a particular feature, structure, or characteristic is described in connection with an implementation, it is submitted that it is within the knowledge of one skilled in the art to affect such feature, structure, or characteristic in connection with other implementations whether or not explicitly described herein.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Objective-C, Swift, Java, Javascript). The aforementioned examples are, of course, illustrative and not restrictive.

As used herein, the terms "image(s)" and "image data" are used interchangeably to identify data representative of visual content which includes, but not limited to, images encoded in various computer formats (e.g., ".jpg", ".bmp," etc.), streaming video based on various protocols (e.g., Real-time Streaming Protocol (RTSP), Real-time Transport Protocol (RTP), Real-time Transport Control Protocol (RTCP), etc.), recorded/generated non-streaming video of various formats (e.g., ".mov," ".mpg," ".wmv," ".avi," ".flv," ect.), and real-time visual imagery acquired through a camera application on a mobile device.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor.

As used herein, the term "user" shall have a meaning of at least one user.

As used herein, the terms "face" and "head" are used interchangeably and both refer to any portion of a user's body situated above the user's shoulders. The terms "face" and "head" are meant to encompass any accessories worn by the user in the portion of the user's body above the shoulders including but not limited to, a hat, glasses, jewelry and the like.

In some embodiments, the present invention provides exemplary inventive computer systems and computer implemented methods for tracking user-related parameters, such as, but not limited to, use, activity, emotional state, commitment, health, safety, and/or similar other parameters while users interact with electronic computing devices. In some embodiments, electronic computing devices may be, without limitation, any electronic computing device at least includes and/or operationally associates with at least one another electronic computer device that includes at least one processor, a digital camera, and an inventive software. For example, an exemplary electronic computing device may be at least one selected from the group of desktop, laptop, mobile device (e.g., tablet, smartphone, etc.), Internet-of-Things (IoT) device (e.g., smart thermostat), and etc.

In some embodiments, the exemplary inventive software with the exemplary inventive computer system are configured to track one or more users' interactions with at least one exemplary electronic computing device as one or more users interact with the at least one exemplary electronic computing device and/or another electronic device (e.g., another electronic computing device). In some embodiments, since the at least one exemplary electronic computing device may include at least one camera that acquires visual input related to the one or more users' activities, the exemplary inventive software with the exemplary inventive computer system are configured to detect and recognize, for example without limitation, at least one or more of the following: face pose, head pose, anthropometrics, facial expression(s), emotion(s), eye(s) and eye-gaze vector(s).

In some embodiments, the exemplary inventive software with the exemplary inventive computer system are configured to estimate, without limitation, a level of user's commitment, a type of activity each user is engaged in (e.g., reading text, watching video, surfing the Internet, etc.), at least one health-related characteristic (e.g., heart rate, HRV). In some embodiments, the exemplary inventive software with the exemplary inventive computer system are configured to generate heath and/or safety-related recommendations when, for example, without limitation, the user interacts with the at least one exemplary electronic computing device for a long time. For example, the one or more heath and/or safety-related recommendations may include one or more recommendations suggesting or requiring to change the type of activity, adjust a parental control for electronic content, and etc.

In some embodiments, the exemplary inventive software with the exemplary inventive computer system are configured to process input visual input (e.g., a set of portrait images) to perform at least one or more of the following:

i) monitor applications that users interact with, ii) real-time track users' physical parameters (e.g., head pose, distance between the user and the computer associated with the camera from which the visual input has been obtained or at least one other electronic device), and iii) real-time tracking users' level of attention to determine the quality of "commitment" (e.g., interest in) to a particular electronic content and/or a particular electronic device (e.g., the computer associated with camera from which the visual input has been obtained, another electronic device), iv) discriminating between several types of user's activities (e.g., reading, watching video, surfing the Internet, writing text, programming, etc.), v) estimating user's health-related characteristics (e.g., heart rate, correct user pose), and;

vi) the real-time generating one or more automatic recommendations (e.g., parental control recommendations) and/or implementing one or more administrative actions (e.g., locking/unlocking one types of electronic content) based, at least in part, on one or more of i-v.

For example, for the reading activity, the exemplary inventive software with the exemplary inventive computer system are configured to estimate how often user(s) lose(s) his/her/their attention by tracking the respective eye-gaze.

In some embodiments, the exemplary inventive software with the exemplary inventive computer system are configured to process visual input (e.g., a set of portrait images) to perform estimation of heart rate and heart rate variability.

In some embodiments, the exemplary inventive software with the exemplary inventive computer system are configured to perform the face detection and tracking in accordance with, without limitation, one or more techniques, methodologies, and/or systems detailed in U.S. application Ser. No. 15/881,353, each of such specific disclosures is incorporated herein by reference in its entirety for such purpose.

In some embodiments, the exemplary inventive software with the exemplary inventive computer system are configured to utilize video input obtained by a typical camera that may have, among other parameters, a resolution of 1.3 megapixels (Mpx) or less (e.g., a resolution of 640×480 or above) and the frame rate in range of 15-60 frame per second (FPS) (e.g., 20 FPS, 30 FPS, 15-30 FPS, 30-60 FPS, etc.) and may lack an IR backlight. In some embodiments, the exemplary inventive software with the exemplary inventive computer system are configured to perform all determinations described herein without a need for any physical contact with the user.

Figure 1:
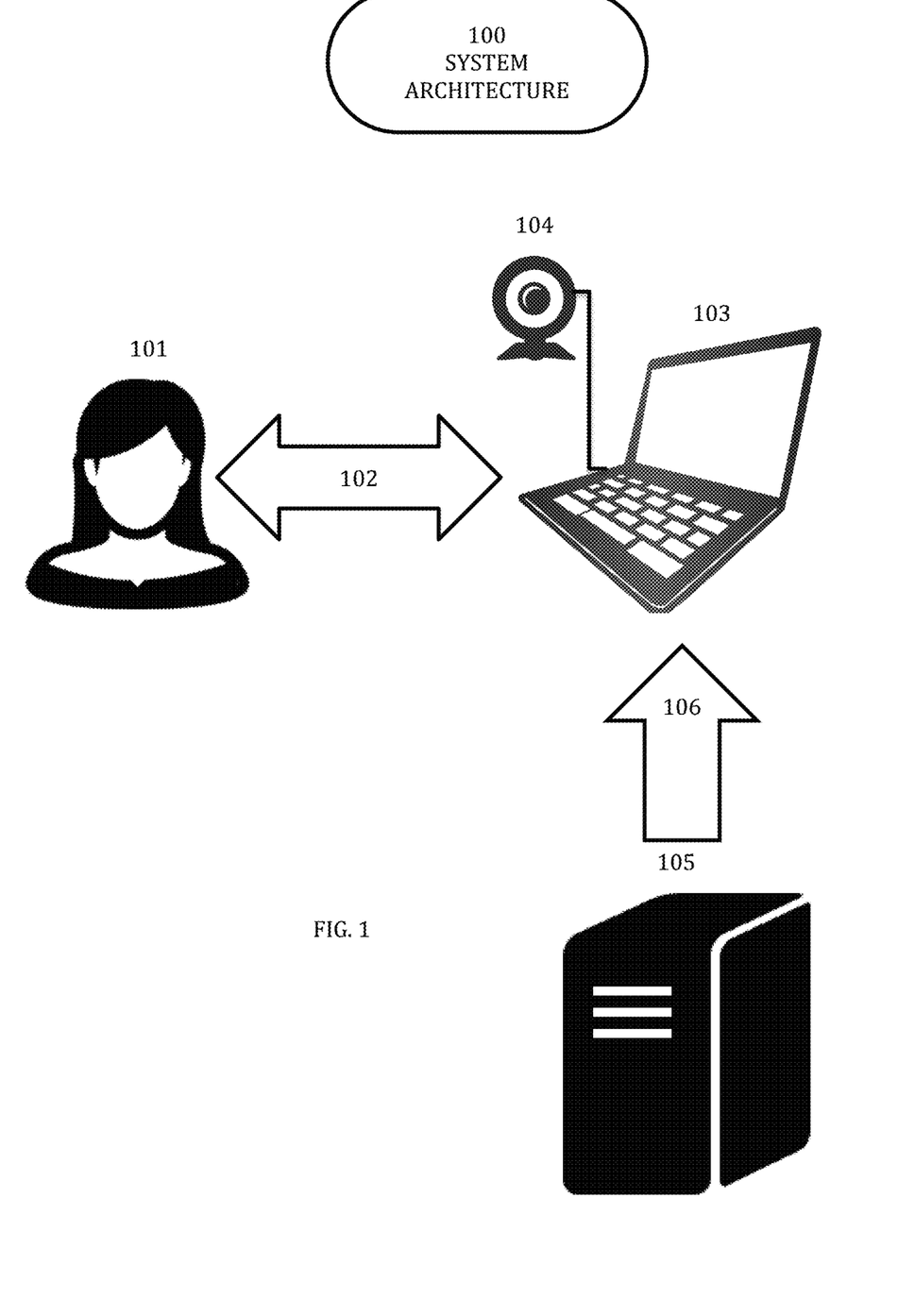
FIGS. 1-6 show one or more schematic flow diagrams, certain computer-based architectures, and/or screenshots of various specialized graphical user interfaces which are illustrative of some exemplary aspects of at least some embodiments of the present disclosure.

FIG. 1 illustrates an exemplary environment 100 in accordance with at least some embodiments of the present invention. As shown in FIG. 1, environment 100 may include a user 101, a computer or mobile device 103, a camera 104 and a server 105. Other devices may also be included. The computer 103 may include any appropriate type of computers, such as desktops, laptops, mobile devices, such as, but not limited to, mobile phones, smartphones and tablets, or any other similarly suitable devices. The exemplary camera 104 may be a built-in camera, or an external camera or any other suitable camera. Further, the server 105 may include any appropriate type of server computer or a plurality of server computers. The user 101 may interact 102 with the computer 103 and the camera 104. The camera 104 continuously tracks the user activity in accordance with one ore principles of the present invention as detailed herein. The user 101 may be a single user or a plurality of users. The computer 103 and the server 105 may be implemented on any appropriate computing circuitry platform as detailed herein.

Figure 2A:
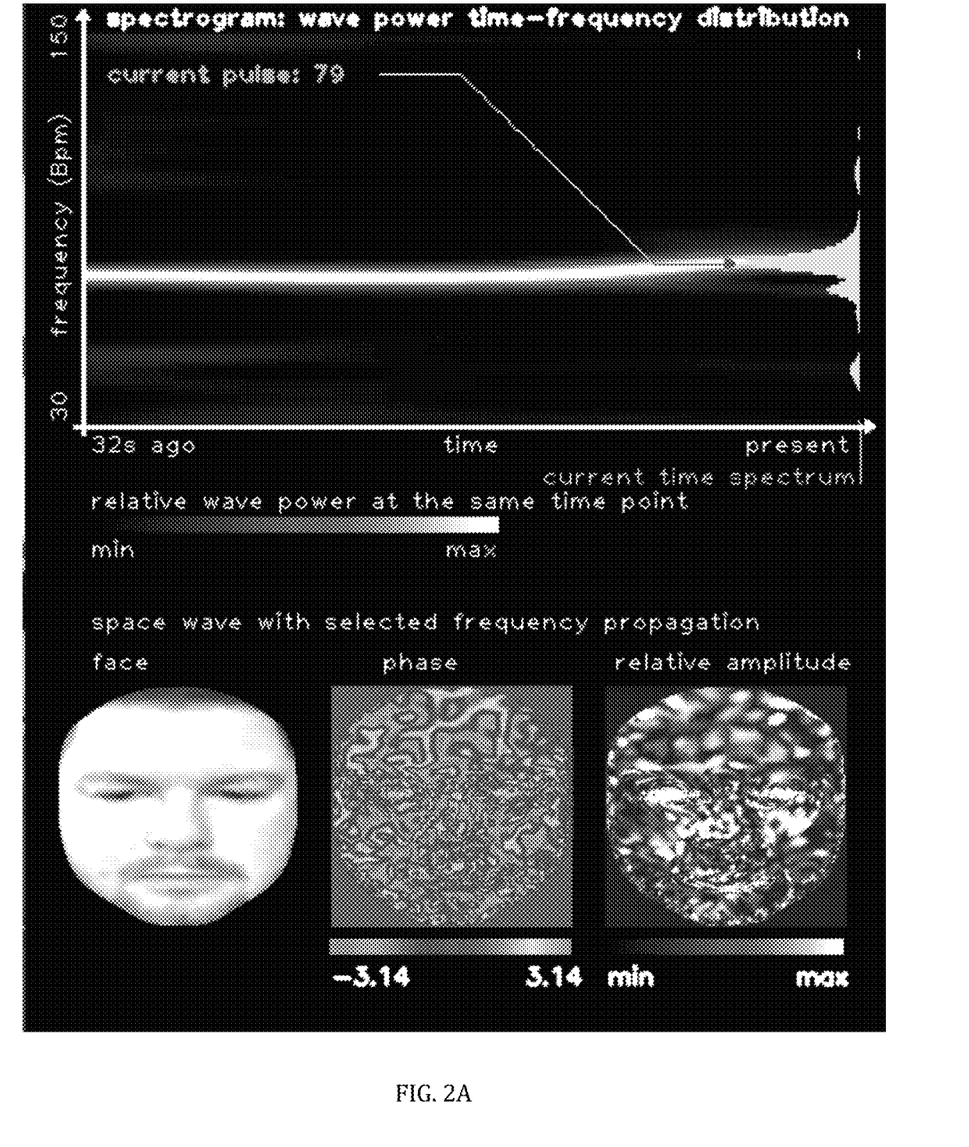
Figure 2B:
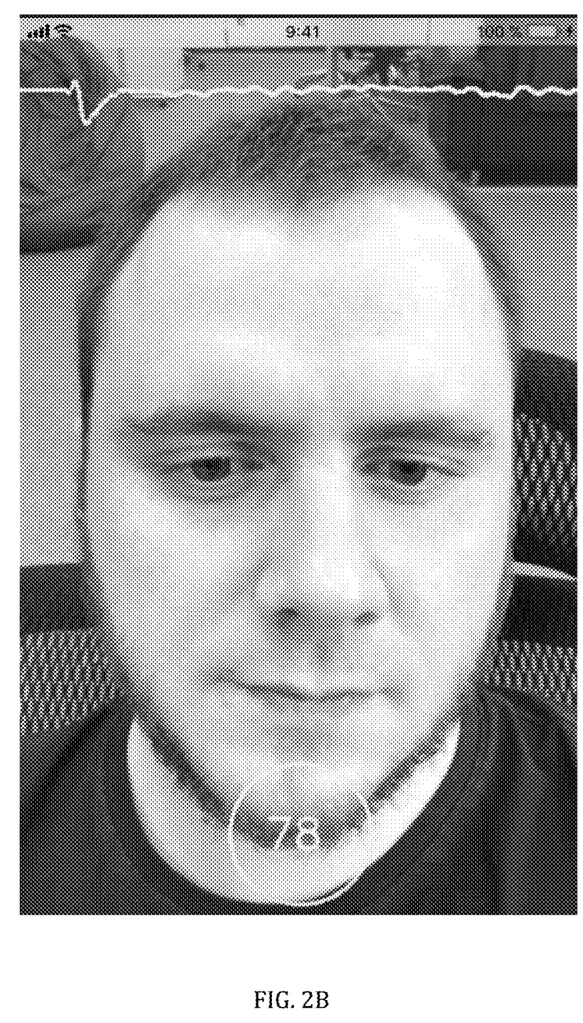

In some embodiments, as detailed herein, the exemplary inventive software with the exemplary inventive computer system are configured to determine the heart rate and heart rate variability by analyzing the face skin color and its variation in time. For example, an exemplary inventive algorithm would take results of the face recognition and selects regions within facial two-dimensional landmarks. Then, the exemplary inventive algorithm analyses variations of skin color caused by blood circulation in facial blood vessels by means of the Fourier analysis. FIGS. 2A-2B illustrate exemplary results of the inventive heart rate estimation from visual input acquired via the frontal mobile device camera. Table 1 illustrates exemplary steps of the exemplary inventive heart rate estimation algorithm.

TABLE 1

| (1) | Input: results of the face recognition algorithm (e.g., three-dimensional face mesh): for example, 3308 three-dimensional face points. |
|---|---|
| (2) | Take the three-dimensional points (10-100) located on a flat facial surface (e.g., cheeks, forehead). |
| (3) | Project the points from (2) onto the two-dimensional screen plane and calculate colors of the respective pixels. |
| (4) | Convert these colors to a color scheme in which brightness and colors are separated (e.g., LAB, YCbCr, HSV, etc.). |
| (5) | Calculate hue. For example, hue is a polar angle in the (a, b) plane for the LAB scheme, or it is a separate component for the HSV scheme. |
| (6) | Calculate a mean value of the hue for all projected points. |
| (7) | Apply a smoothing filter (e.g., the Butterworth filter) for the signal, derived in |
| (6) | to remove the constant component. |
| (8) | Apply the short-time Fourier transform using the moving window of 15 seconds and a window function, either a Hann window or Gaussian window centered around zero. |
| (9) | Obtain a spectral representation of the signal by applying the procedure (8). |
| (10) | Find a frequency with the largest weight, which is considered as the main heart-rate frequency. |

In some embodiments, as detailed herein, the exemplary inventive software with the exemplary inventive computer system are configured to determine the heart rate variability (HRV). At the stage of calculating the heart rate, there is a convolution with the sines and cosines of the set of frequencies (as described in Table 1).

Then, for each frequency, e.g., Equation 1 below is calculated;

$$\sqrt{sn^2 + cs^2} \qquad \text{(Eq. 1)}$$

where sn and cs are the result of convolutions of the average face colour with the sine and cosine of the corresponding frequency. The phase of the signal is calculated for the frequency as follows in, e.g., equation 2 below:

$$ph = \arctan\left(\frac{sn}{cs}\right) \qquad \text{(Eq. 2)}$$

This results in the maximum power according, e.g., Equation 1 wove, e.g., $$w = \sqrt{sn^2 + cs^2}$$

where w is the power. The phase ph grow monotonously from −pi to pi and then drops back to −pi. The jumps are associated with some specific phase of a QRS complex, where the QRS complex is a combination of three waves depicting activity by the heart: A Q wave is any downward deflection immediately following the P wave. An R wave follows as an upward deflection, and the S wave is any downward deflection after the R wave. The T wave follows the S wave, and in some cases, an additional U wave follows the T wave. Then, the inventive algorithm measures the time intervals between these moments and accumulates this data, based on which the HRV is estimated as described in Table 2. Table 2 illustrates exemplary steps of the exemplary inventive heart rate variability estimation algorithm.

TABLE 2

(1) Input: estimated heart rate, as described in Table 1.
(2) For the frequency of the estimated heart rate, measure the phase (as described above) and save to a list.
(3) Calculate average period T = (1 min/HR), where HR is the estimated heart rate.
(4) Calculate the phase differences ph[i + 1] − ph[i] according to the results in (2).
(5) Save time values when abs(ph[i + 1] − ph[i]) > pi.
(6) Calculate intervals (t) between events in (5).
(7) Save intervals t for which the following condition is satisfied: 0.25 T <= t <= 2 T.
(8) For intervals (7) calculate the average absolute difference with T.
(9) Assign result of (8) to the estimated HRV.

Figure 3:
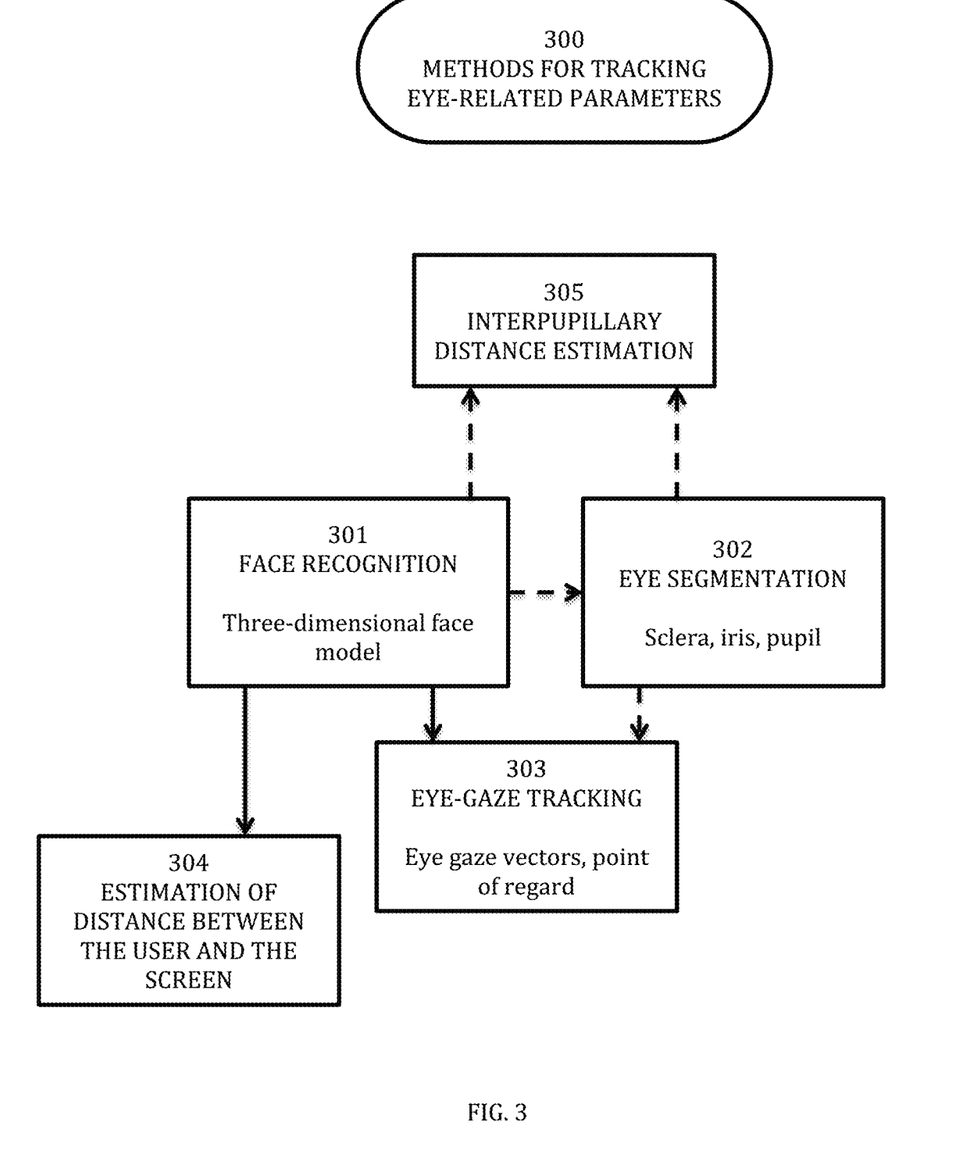

FIG. 3 illustrates the exemplary inventive software with the exemplary inventive computer system that are configured to track one or more of user eye-related parameters in accordance with at least some embodiments of the present invention. For example, the exemplary inventive software with the exemplary inventive computer system that are configured to continuously process the visual input (e.g., video frames) utilizing one or more face recognitions algorithms 201 (e.g., one or more techniques, methodologies, and/or systems detailed in U.S. application Ser. No. 15/881,353). For example, one or more face recognitions algorithms 201 may include combined regressors (random forests+ linear regressions) that take local binary features and fit human face with a three-dimensional face model, that may include one or more of the following meta-parameters: camera position (e.g., rotations, translates, etc.), facial anthropometric variables, facial expression variables, light vector, etc. For example, one or more face recognitions algorithms 201 may be executed in face detection and/or face tracking modes. For example, the exemplary inventive software with the exemplary inventive computer system that are configured to use the output from applying the one or more face recognitions algorithms 201 generate, in real-time, a complete three-dimensional face model. For example, the inventive eye segmentation module 202 may include one or more inventive algorithms aimed to detect precise positions of eye sclera, iris and pupil in at least one portrait image. For example, the inventive eye-gaze detection module 203 may include one or more inventive algorithms aimed to estimate both eye-gaze vector and eye-gaze point (point of regard) in the camera coordinates, screen coordinates or other suitable coordinate system. For example, the exemplary inventive software with the exemplary inventive computer system that are configured to detect eye-gaze based, at least in part, on the results obtained by the face recognition 201, as detailed further, for example without limitation, with respect to Table 3.

Referring to FIG. 3, for example, in at least some embodiments, the exemplary inventive software with the exemplary inventive computer system are configured to utilize at least one of the following two techniques to estimate a center of each eye:

(1a) a two-dimensional center estimation based on the two-dimensional landmarks (e.g., using face recognition results 301); or
(1b) a two-dimensional center estimation based on the eye segmentation masks (e.g., using eye segmentation results 302); and
(2) an estimation of a three-dimensional center of each eyeball, as an extension of the three-dimensional face model.

For example, in at least some embodiments, the exemplary inventive software with the exemplary inventive computer system are configured to utilize at least one of the following techniques of the eye pupil detection (1a):

(i) search for the smoothed two-dimensional minimum on the eye mesh;
(ii) search for the iris boundary by the two-dimensional gradient approach, while the pupil is located in the geometrical center of the found iris boundary; i.e. search for centers of the gradient field on regular or irregular grids of eye regions based, at least in part, on equation 3:

$$c^* = \underset{c}{\operatorname{argmax}}\left\{\frac{1}{N}\sum_{i=1}^{N}(d_i^T g_i)^2\right\}, \qquad \text{(eq. 3)}$$

where N is number of pixels in the eye region, $g_i$— gradients, $d_i$—displacement vectors, c—centers of gradients, c*—optimal center of all detected gradients. For example, the search for the smoothed two-dimensional minimum on the eye mesh may be based, at least in part, on determining the two-dimensional moving average minimum (e.g., a minimum found on the averaged two-dimensional grid as detailed in Table 3). In another example, the search for the smoothed two-dimensional minimum on the eye mesh may be based, at least in part, on using at least one median filter or any other suitable filter (e.g., particle filter).

For example, in at least some embodiments, the exemplary inventive software with the exemplary inventive computer system are configured to utilize at least one of the following techniques of the eye pupil detection (1b):

(i) geometric center of pupil segmentation mask; or/and
(ii) geometric center of iris segmentation mask.

For example, the exemplary inventive estimation of distance between the user and the screen module 304 may be based, at least in part, on equation 4:

$$IPD \times L_{px}/IPD_{px} \times \cos(r_y) = 2 \times D \times \tan(FOV/2) \quad \text{(eq. 4)},$$

where IPD is the actual interpupillary distance, e.g., measured in mm; $IPD_{px}$—the measured interpupillary distance in screen coordinates (in pixels); D—distance between the user and the screen, e.g. in mm (units are the same as for IPD); $\cos(r_y)$—head rotation; FOV—field of view along the frame side $L_{px}$.

For example, the estimation of distance between the user and the screen 304 may be based, at least in part, on the comparison of the actual interpupillary distance (IPD) and the measured IPD in the screen coordinate system. For example, the actual IPD may be the average known IPD, e.g., 64 mm (male) and 62 mm (female). As a result, the distance between the user and the screen 304 may be estimated with the accuracy less than 1 cm.

For example, the exemplary inventive interpupillary distance estimation module 305 may be based, at least in part, on equation 4, for which the distance D may be taken from the camera depth map, and the IPD may be calculated.

For example, as illustrated without limitation in Table 3, in at least some embodiments, the exemplary inventive software with the exemplary inventive computer system are configured to calculate the eye-gaze vector using at least the two reference points of the eye pupil and eye center.

For example, in at least some embodiments, the exemplary inventive software with the exemplary inventive computer system are configured to calculate the eye-gaze point as a projection of the eye-gaze vector on the screen plane.

Table 3 illustrates exemplary steps of the exemplary inventive exemplary eye-gaze estimation algorithm.

TABLE 3

(1) i) Get two-dimensional centers of eyes as an average (any type) of N two-dimensional eye landmarks (e.g., N = 2 - for the left and right eye corner, N = 6 for the left and right corners, two upper and two lower landmarks, N > 6 - for other averaging methods). OR
ii) Get three-dimensional centers of eyes as the mean values of the three-dimensional eyeball meshes.
(2) Get three-dimensional face mesh as a result of the real-time face recognition model (3308 three-dimensional points for the exemplary implementation).
(3) Select three-dimensional face mesh points that belong to the eye regions (e.g., 106 points for each eye region for the exemplary implementation) and project them to the screen coordinate plane.
(4) a) Find minimum of luminance (e.g., Y component of the YCbCr color space) on the two-dimensional eye points found in (3). To reduce the jitter and increase stability of the detected position of eye pupils, a two-dimensional moving average or other suitable smoothing technique may be applied (e.g., applying e.g., median filter or particle filter). For example, the moving average on the windows 3 × 3 and 5 × 5 may be used. OR
b) Find geometric centers of pupil masks; find geometric centers of iris masks.
(5) Estimate the eyeball radii from the three- and two-dimensional face landmarks.
(6) Given eyeball radii, eye centers and pupil positions, compute the eye gaze vector.
(7) Project the eye gaze vector onto the screen coordinate plane and get the eye gaze point.
(8) Optionally, apply a calibration technique if needed. For example, the calibration technique may include linear transforms of the estimated parameters (e.g., eyeball radii, eye gaze coordinates x or/and y).

For example, in at least some embodiments, the exemplary inventive software with the exemplary inventive computer system are configured to determine the eye segmentation 302 by solving a deep learning classification problem. For example, in at least some embodiments, the exemplary inventive software with the exemplary inventive computer system are configured to utilize an exemplary convolutional neural network that is trained on a synthetic dataset that may be produced by using, without limitation, one or more of:
1) Blender library,
2) FaceGen library (facegen.com) by Singular Inversions Inc. (Toronto, Calif.),
3) Unity 3D engine (Unity Technologies ApS, San Francisco, Calif.), and
4) any other similarly suitable dataset.

The result is the segmentation classes such as, without limitation: pupil, iris, sclera and background.

Figure 4:
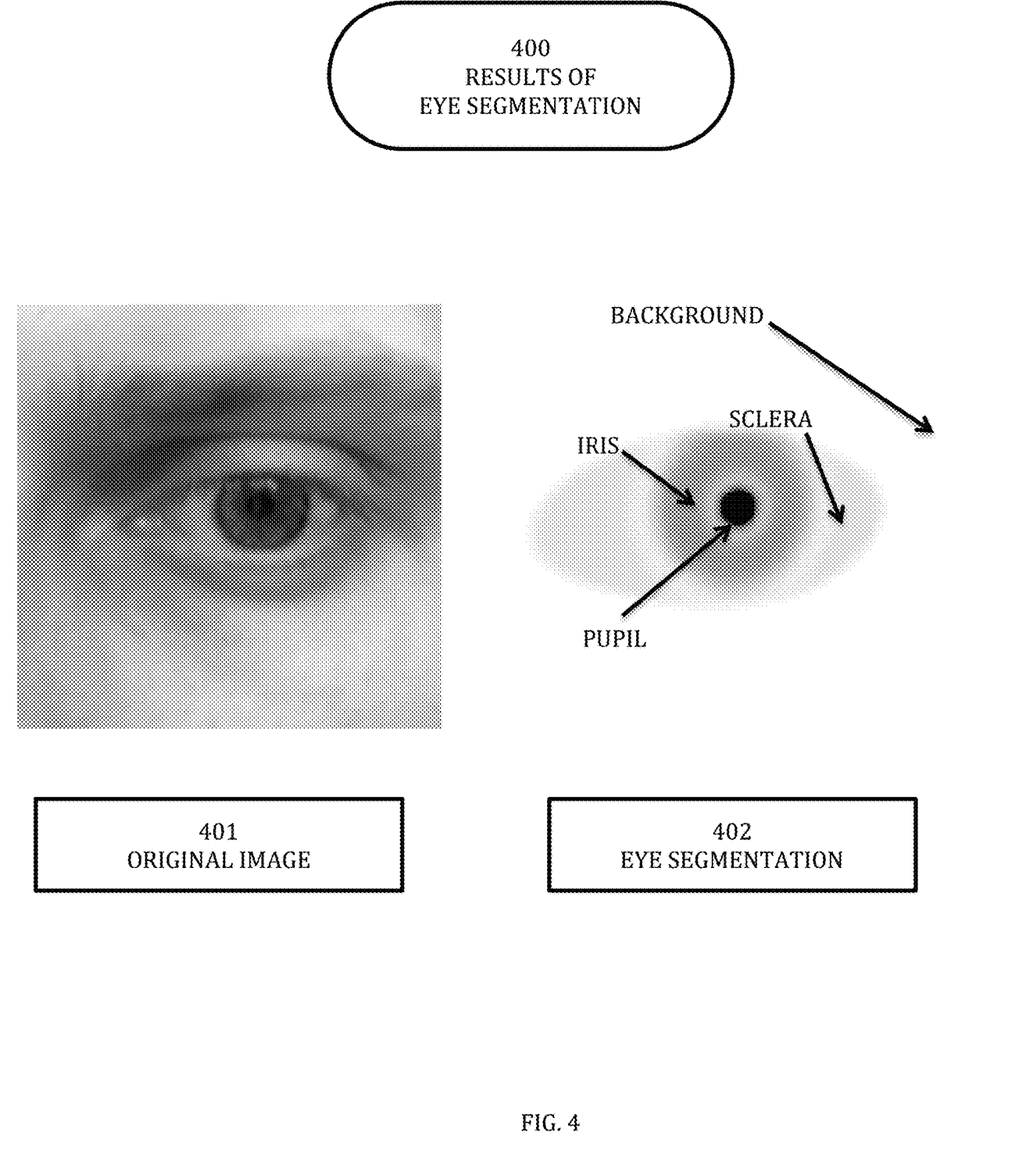

FIG. 4 illustrates results of utilizing the exemplary inventive trained neural network for the eye segmentation task.

Figure 5:
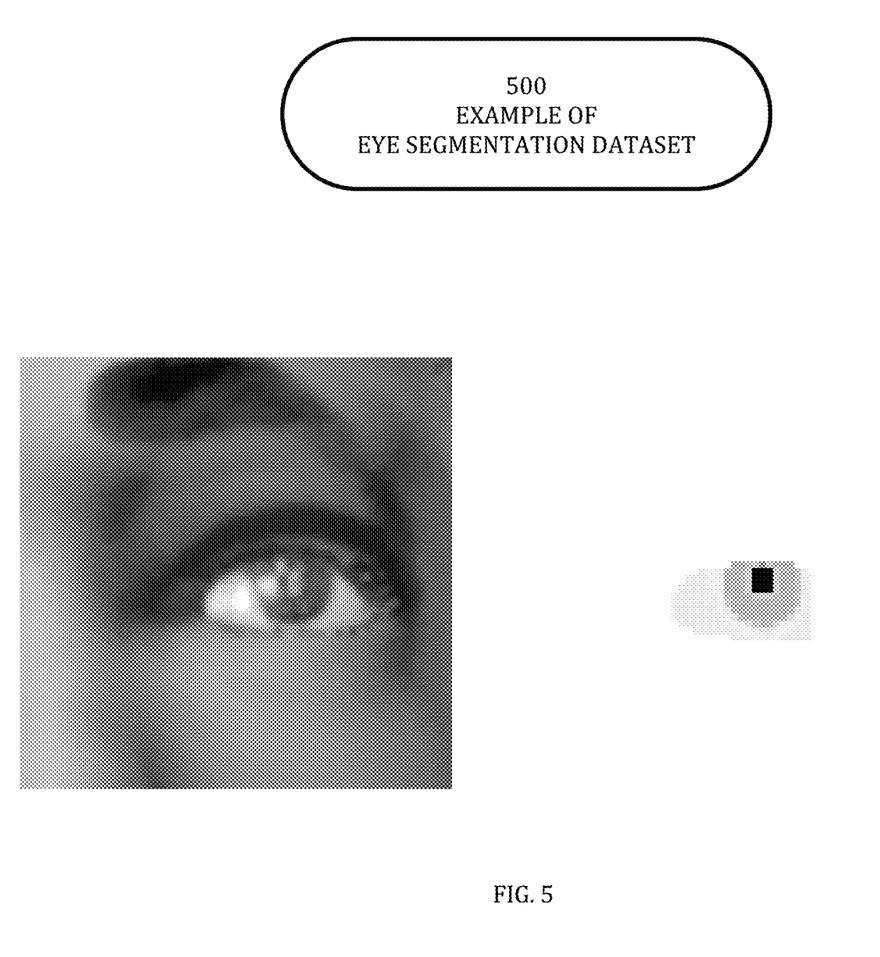

FIG. 5 illustrates the exemplary sample of the dataset on which the exemplary inventive neural network is trained for eye segmentation task.

Table 4 illustrates exemplary configuration of the exemplary inventive neural network for eye segmentation.

TABLE 4

| Layer (type) Output Shape Param # |
| --- |
| input_1 (InputLayer) (None, 128, 128, 3) 0 |
| conv2d_downs_0_1 (Conv2D) (None, 128, 128, 8) 224 |
| BN_down_0_1 (BatchNormalizat (None, 128, 128, 8) 32 |
| prelu_downs_0_1 (PReLU) (None, 128, 128, 8) 8 |
| max_pooling2d_1 (MaxPooling2 (None, 64, 64, 8) 0 |
| conv2d_downs_1_1 (Conv2D) (None, 64, 64, 16) 1168 |
| BN_down_1_1 (BatchNormalizat (None, 64, 64, 16) 64 |
| prelu_downs_1_1 (PReLU) (None, 64, 64, 16) 16 |
| max_pooling2d_2 (MaxPooling2 (None, 32, 32, 16) 0 |
| conv2d_downs_2_1 (Conv2D) (None, 32, 32, 32) 4640 |
| BN_down_2_1 (BatchNormalizat (None, 32, 32, 32) 128 |
| prelu_downs_2_1 (PReLU) (None, 32, 32, 32) 32 |
| max_pooling2d_3 (MaxPooling2 (None, 16, 16, 32) 0 |
| conv2d_downs_3_1 (Conv2D) (None, 16, 16, 64) 18496 |

TABLE 4-continued

| Layer (type) Output Shape Param # |
| --- |
| BN_down_3_1 (BatchNormalizat (None, 16, 16, 64) 256 |
| prelu_downs_3_1 (PReLU) (None, 16, 16, 64) 64 |
| max_pooling2d_4 (MaxPooling2 (None, 8, 8, 64) 0 |
| conv2d_downs_4_1 (Conv2D) (None, 8, 8, 128) 73856 |
| BN_down_4_1 (BatchNormalizat (None, 8, 8, 128) 512 |

TABLE 4-continued

| Layer (type) Output Shape Param # |
|---|
| prelu_downs_4_1 (PReLU) (None, 8, 8, 128) 128 |
| conv2d_down_s1 (Conv2D) (None, 8, 8, 64) 73792 |
| BN_down_s1 (BatchNormalizati (None, 8, 8, 64) 256 |
| prelu_down_s1 (PReLU) (None, 8, 8, 64) 64 |
| conv2d_down_s2 (Conv2D) (None, 8, 8, 64) 36928 |
| BN_down_s2 (BatchNormalizati (None, 8, 8, 64) 256 |
| prelu_down_s2 (PReLU) (None, 8, 8, 64) 64 |
| conv2d_down_s3 (Conv2D) (None, 8, 8, 64) 36928 |
| BN_down_s3 (BatchNormalizati (None, 8, 8, 64) 256 |
| prelu_down_s3 (PReLU) (None, 8, 8, 64) 64 |
| conv2d_down_s4 (Conv2D) (None, 8, 8, 64) 36928 |
| BN_down_s4 (BatchNormalizati (None, 8, 8, 64) 256 |
| prelu_down_s4 (PReLU) (None, 8, 8, 64) 64 |
| max_pooling2d_5 (MaxPooling2 (None, 4, 4, 64) 0 |
| flatten1 (Flatten) (None, 1024) 0 |
| dense128_s (Dense) (None, 256) 262400 |
| dense1024_s (Dense) (None, 1024) 263168 |
| reshape_1 (Reshape) (None, 4, 4, 64) 0 |
| up_sampling2d_1 (UpSampling2 (None, 8, 8, 64) 0 |
| conv2d_up_s1 (Conv2D) (None, 8, 8, 64) 36928 |
| BN_up_s1 (BatchNormalization (None, 8, 8, 64) 256 |
| prelu_up_s1 (PReLU) (None, 8, 8, 64) 64 |
| conv2d_up_s2 (Conv2D) (None, 8, 8, 64) 36928 |
| BN_up_s2 (BatchNormalization (None, 8, 8, 64) 256 |
| prelu_up_s2 (PReLU) (None, 8, 8, 64) 64 |
| conv2d_up_s3 (Conv2D) (None, 8, 8, 64) 36928 |
| BN_up_s3 (BatchNormalization (None, 8, 8, 64) 256 |
| prelu_up_s3 (PReLU) (None, 8, 8, 64) 64 |
| conv2d_up_s4 (Conv2D) (None, 8, 8, 64) 36928 |
| BN_up_s4 (BatchNormalization (None, 8, 8, 64) 256 |
| prelu_up_s4 (PReLU) (None, 8, 8, 64) 64 |
| conv2d_ups_0_1 (Conv2D) (None, 8, 8, 128) 73856 |
| BN_up_0_1 (BatchNormalizatio (None, 8, 8, 128) 512 |
| prelu_ups_0_1 (PReLU) (None, 8, 8, 128) 128 |
| up_sampling2d_2 (UpSampling2 (None, 16, 16, 128) 0 |
| conv2d_ups_1_1 (Conv2D) (None, 16, 16, 64) 73792 |
| BN_up_1_1 (BatchNormalizatio (None, 16, 16, 64) 256 |
| prelu_ups_1_1 (PReLU) (None, 16, 16, 64) 64 |
| up_sampling2d_3 (UpSampling2 (None, 32, 32, 64) 0 |
| conv2d_ups_2_1 (Conv2D) (None, 32, 32, 32) 18464 |
| BN_up_2_1 (BatchNormalizatio (None, 32, 32, 32) 128 |
| prelu_ups_2_1 (PReLU) (None, 32, 32, 32) 32 |
| up_sampling2d_4 (UpSampling2 (None, 64, 64, 32) 0 |
| conv2d_ups_3_1 (Conv2D) (None, 64, 64, 16) 4624 |
| BN_up_3_1 (BatchNormalizatio (None, 64, 64, 16) 64 |
| prelu_ups_3_1 (PReLU) (None, 64, 64, 16) 16 |
| up_sampling2d_5 (UpSampling2 (None, 128, 128, 16) 0 |
| conv2d_ups_4_1 (Conv2D) (None, 128, 128, 8) 1160 |
| BN_up_4_1 (BatchNormalizatio (None, 128, 128, 8) 32 |
| prelu_ups_4_1 (PReLU) (None, 128, 128, 8) 8 |
| finalConv (Conv2D) (None, 128, 128, 4) 292 |
| activation_1 (Activation) (None, 128, 128, 4) 0 |

Total params: 1,133,468
Trainable params: 1,131,452
Non-trainable params: 2,016

Figure 6:
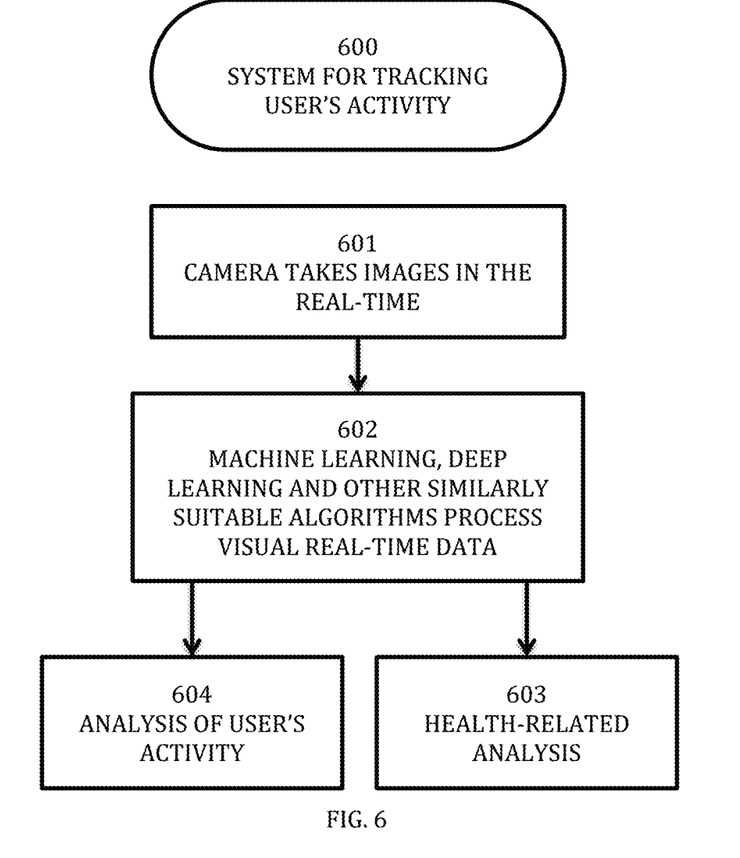

FIG. 6 illustrates the exemplary inventive system for inventive tracking users' activity 600. As it shown in FIG. 6, in some embodiments, as detailed herein, the exemplary inventive software with the exemplary inventive computer system are configured to track users' activity and/or health in at least the following stages. During the stage 601, an exemplary specialized processor, executing the exemplary inventive software, is programmed to receive, in real-time, the visual input (e.g., a series of images) taken by a camera 104 and provide them sent to one or more machine learning algorithms 602, which dynamically process, in real-time, the visual input (e.g., a series of images) to detect and track the user's face, automatically segment parts of the user's face, and, optionally, subtract background, such as for, e.g., eye-segmentation for eye-gaze tracking and/or facial recognition for heartrate and heartrate variability recognition.

In some embodiments, the results of the one or more inventive algorithms 602 may be used for the one or more inventive algorithms 603 to estimate health-related characteristics (such as, without limitation, health characteristics related to heart rate and HRV, etc.). In some embodiments, the health-related analysis 603 may include, e.g., determination and display of a heartrate and/or heartrate variability, determination of a cardiac condition or episode (e.g., heart attack or other condition), among other analyses. In some embodiments, the determination of a cardiac condition may include notifying an emergency service of a related medical emergency. In some embodiments, the results of the one or more inventive algorithms 602 may be used for the one or more inventive algorithms 604 analyze user's activity and point of interest or focus according to, e.g., eye-gaze point using the inventive eye-gaze tracking described above. In some embodiments, the activity analysis 604 may include, e.g., analyzing a point of focus of the user, such as, e.g., determining a product being view for advertising analysis, determining whether a user is viewing a road while driving, or other analyses employing the eye-gaze point.

At least some aspects of the present disclosure will now be described with reference to the following numbered clauses.

1. A method, comprising:
capturing, by a camera, an image of a user with a camera;
determining, by the processor, an estimate of a geometric center of each eye in the image based on eye landmarks;
generating, by the processor, a three-dimensional (3D) model of a face by applying combined regressors;
wherein the combined regressors map local binary features of the image to the 3D model;
wherein generating the 3D model comprises classifying each eye region in the image;
projecting, by the processor, each eye region of the 3D model onto a screen coordinate plane to produce two-dimensional (2D) eye points for each eye region;
wherein the screen coordinate plane comprises a set of coordinates relative to a screen in communication with the processor;
determining, by the processor, a position of each of a sclera, an iris and a pupil based on the 3D model;
determining, by the processor, a gaze vector based on at least a relationship between the geometric center and the position of the pupil of each eye region;
projecting, by the processor, the gaze vector onto the screen coordinate plane to identify a gaze point associated with a location on the screen at which the user is looking; and
recording, by the processor, the gaze point in the memory.

2. The method of item 1, further comprising:
generating, by the processor, a 2D eye mesh based on a recognition of the eye landmarks; and
determining, by the processor, a smoothed 2D minimum associated with the pupil on the 2D eye mesh to estimate the geometric center of each eye.

3. The method of item 1, further comprising:
generating, by the processor, a 2D eye mesh based on a recognition of the eye landmarks;
determining, by the processor, a gradient field of the 2D eye mesh; and
determining, by the processor, an optimal center of the gradient field to estimate the geometric center of each eye.

4. The method of item 1, further comprising:
generating, by the processor, a 2D eye segmentation mask based on an eye segmentation to recognize the eye landmarks; and determining, by the processor, the pupil on the 2D eye segmentation mask to estimate the geometric center of each eye.

5. The method of item 1, further comprising:
determining, by the processor, a 3D eye mesh for each eye region based on the 3D model; and
determining, by the processor, a 3D center of each 3D eye mesh to estimate the geometric center of each eye.

6. The method of item 1, further comprising:
determining, by the processor, an estimate of an interpupillary distance associated with the user;
determining, by the processor, a measured interpupillary distance of the eye regions measured on the screen coordinate plane; and
determining, by the processor, a distance from the screen of the user based on at least the interpupillary distance and the measured interpupillary distance.

7. The method of item 6, wherein the projecting of the gaze vector is based on the distance.

8. The method of item 1, further comprising determining, by the processor, an estimate of an eyeball radius for each eye region based on the eye landmarks.

9. The method of item 8, further comprising calibrating, by the processor, the gaze point with a linear transformation of the eyeball radius of each eye region and the gaze point.

10. A method, comprising:
receiving, by at least one processor, a sequence of images of a face of a user from at least one image capture device;
generating, by the at least one processor, a three-dimensional (3D) model of the face in the sequence of images according to a face recognition algorithm;
determining, by the at least one processor, a plurality of 3D facial points associated with one or more flat facial surfaces on the 3D model of the face;
projecting, by the at least one processor, the plurality of 3D facial points onto a screen coordinate plane to produce a plurality of two-dimensional (2D) facial points;
wherein the screen coordinate plane comprises a set of coordinates relative to a screen in communication with the processor;
determining, by the at least one processor, a hue of each pixel associated with each of the plurality of 2D facial points in each image of the sequence of images;
determining, by the at least one processor, a mean hue value associated with the face based on an averaging of the hue of each pixel of each of the plurality of 2D facial points in each image of the sequence of images;
wherein the mean hue value is determined with a moving window;
determining, by the at least one processor, a spectral representation of a variation in the mean hue value across the sequence of images;
determining, by the at least one processor, a frequency of a main hue based on a largest weight of the variation in the mean hue value for each of the plurality of 2D facial points in each image of the sequence of images;
determining, by the at least one processor, a heart rate of the user based on a blood circulation to facial blood vessels according to the frequency of the main hue; and
causing, by the at least one processor, to display at a screen of a computing device at least one activity recommendation based at least in part on the heart rate.

11. A method, comprising:
receiving, by at least one memory device, a sequence of images of a face of a user from an image capture device;
generating, by at least one processor, a three-dimensional (3D) model of the face in the sequence of images according to a face recognition algorithm;
determining, by the at least one processor, a plurality of 3D facial points associated with one or more flat facial surfaces on the 3D model of the face;
projecting, by the at least one processor, the plurality of 3D facial points onto a screen coordinate plane to produce a plurality of two-dimensional (2D) facial points;
wherein the screen coordinate plane comprises a set of coordinates relative to a screen in communication with the processor;
determining, by the at least one processor, a hue of each pixel associated with each of the plurality of 2D facial points in each image of the sequence of images;
determining, by the at least one processor, a mean hue value associated with each of the plurality of 2D facial points in each image of the sequence of images;
wherein the mean hue value is determined with a moving window;
determining, by the at least one processor, a spectral representation of a variation in the mean hue value for each of the plurality of 2D facial points across the sequence of images;
determining, by the at least one processor, a frequency of a main hue based on a largest weight of the variation in the mean hue value for each of the plurality of 2D facial points across the sequence of images;
determining, by the at least one processor, a heart rate based blood circulation to facial blood vessels according to the frequency of the main hue;
determining, by the at least one processor, a phase of the heart rate based on the frequency of the main hue;
determining, by the at least one processor, an average period of the heart rate;
determining, by the at least one processor, phase differences based on a change in the phase across the sequence of images;
determining, by the at least one processor, an absolute difference from the average period based on the phase differences to estimate heart rate variability of the user; and
causing, by the at least one processor, to display with a screen an activity recommendation based at least on the heart rate variability.

12. The method of item 10 or 11, further comprising filtering, by the at least one processor, the mean hue value for each of the plurality of 2D facial points using a Butterworth filter.

13. The method of item 10 or 11, further comprising:
determining, by the at least one processor, a color value associated with each pixel of the plurality of 2D facial points in each image of the sequence of images;
determining, by the at least one processor, a separation in a brightness and a color from each color value; and
determining, by the at least one processor, the hue based on the color of each pixel.

14. The method item 10 or 11, wherein the moving window is one of a Hann window or a Gaussian window centered around zero.

15. The method of item 10 or 11, wherein the moving window is a predetermined time moving window.

16. The method of item 10 or 11, wherein the sequence of images comprises a real-time feed of images captured by image capture device.

17. The method of item 10 or 11, wherein the image capture device is a camera of a mobile computing device.

18. The method of item 10 or 11, wherein the plurality of 3D facial points comprises between 10 and 100 3D facial points.

19. The method of item 10 or 11, wherein the 3D model comprises 3308 points.

20. The method of item 10 or 11, further comprising:
determining, by the at least one processor, a power associated with each hue frequency in the spectral representation based on a convolution of a sine of the mean hue value and on a convolution of a cosine of the mean hue value;
wherein each hue frequency is associated with a distinct hue; and
determining, by the at least one processor, the frequency having a maximum power in the spectral representation;
wherein the phase is calculated across the sequence of images based on the convolution of the sine of the mean hue value and on the convolution of the cosine of the mean hue value for the frequency with the maximum power.

21. The method of item 10 or 11, further comprising:
determining, by the at least one processor, a phase associated with each image in the sequence of images;
wherein the phase is based on an arc angle of a convolution of a sine of the mean hue value and on a convolution of a cosine of the mean hue value for the frequency of the main hue in the spectral representation; and
determining, by the at least one processor, the phase differences between each image in the sequence of images based on a difference between the phase associated with each image in the sequence of images.

22. The method of item 10 or 11, further comprising:
determining, by the at least one processor, phase change intervals based on intervals of time between adjacent images in the sequence of images having threshold phase differences; and
wherein the threshold phase differences comprise the phase differences greater than about pi.

23. The method of item 13, further comprising:
determining, by the at least one processor, relevant threshold phase change intervals based on the phase change intervals and the average period;
wherein the relevant threshold phase change intervals comprise intervals of the threshold phase change intervals having a duration between about one quarter of the average period and about twice the average period; and
determining, by the at least one processor, the absolute difference between the relevant threshold phase change intervals and the average period.

24. The method of item 10 or 11, further comprising:
determining, by the at least one processor, a color value associated with each pixel of the plurality of 2D facial points in each image of the sequence of images;
determining, by the at least one processor, a separation between a brightness and a color from each color value; and
determining, by the processor, the hue based on the color of each pixel.

While a number of embodiments of the present invention have been described, it is understood that these embodiments are illustrative only, and not restrictive, and that many modifications may become apparent to those of ordinary skill in the art, including that various embodiments of the inventive methodologies, the inventive systems, and the inventive devices described herein can be utilized in any combination with each other. Further still, the various steps may be carried out in any desired order (and any desired steps may be added and/or any desired steps may be eliminated).

The invention claimed is:

1. A method, comprising:
receiving, by at least one processor, a sequence of images of a face of a user from at least one image capture device;
generating, by the at least one processor, a three-dimensional (3D) model of the face in the sequence of images according to a face recognition algorithm;
determining, by the at least one processor, a plurality of 3D facial points associated with one or more flat facial surfaces on the 3D model of the face;
projecting, by the at least one processor, the plurality of 3D facial points onto a screen coordinate plane to produce a plurality of two-dimensional (2D) facial points;
wherein the screen coordinate plane comprises a set of coordinates relative to a screen in communication with the processor;
determining, by the at least one processor, a hue of each pixel associated with each of the plurality of 2D facial points in each image of the sequence of images;
determining, by the at least one processor, a mean hue value associated with the face based on an averaging of the hue of each pixel of each of the plurality of 2D facial points in each image of the sequence of images;
wherein the mean hue value is determined with a moving window;
determining, by the at least one processor, a spectral representation of a variation in the mean hue value across the sequence of images;
determining, by the at least one processor, a frequency of a main hue based on a largest weight of the variation in the mean hue value for each of the plurality of 2D facial points in each image of the sequence of images;
determining, by the at least one processor, a heart rate of the user based on a blood circulation to facial blood vessels according to the frequency of the main hue; and
causing, by the at least one processor, to display at a screen of a computing device at least one activity recommendation based at least in part on the heart rate.

2. The method of claim 1, further comprising filtering, by the at least one processor, the mean hue value for each of the plurality of 2D facial points using a Butterworth filter.

3. The method of claim 1, further comprising:
determining, by the at least one processor, a color value associated with each pixel of the plurality of 2D facial points in each image of the sequence of images;
determining, by the at least one processor, a separation in a brightness and a color from each color value; and
determining, by the at least one processor, the hue based on the color of each pixel.

4. The method claim 1, wherein the moving window is one of a Hann window or a Gaussian window centered around zero.

5. The method of claim 1, wherein the moving window is a predetermined time moving window.

6. The method of claim 1, wherein the sequence of images comprises a real-time feed of images captured by image capture device.

7. The method of claim 1, wherein the image capture device is a camera of a mobile computing device.

8. The method of claim 1, wherein the plurality of 3D facial points comprises between 10 and 100 3D facial points.

9. The method of claim 1, wherein the 3D model comprises 3308 points.

10. A method, comprising:
receiving, by at least one memory device, a sequence of images of a face of a user from an image capture device;
generating, by at least one processor, a three-dimensional (3D) model of the face in the sequence of images according to a face recognition algorithm;
determining, by the at least one processor, a plurality of 3D facial points associated with one or more flat facial surfaces on the 3D model of the face;
projecting, by the at least one processor, the plurality of 3D facial points onto a screen coordinate plane to produce a plurality of two-dimensional (2D) facial points;
wherein the screen coordinate plane comprises a set of coordinates relative to a screen in communication with the processor;
determining, by the at least one processor, a hue of each pixel associated with each of the plurality of 2D facial points in each image of the sequence of images;
determining, by the at least one processor, a mean hue value associated with each of the plurality of 2D facial points in each image of the sequence of images;
wherein the mean hue value is determined with a moving window;
determining, by the at least one processor, a spectral representation of a variation in the mean hue value for each of the plurality of 2D facial points across the sequence of images;
determining, by the at least one processor, a frequency of a main hue based on a largest weight of the variation in the mean hue value for each of the plurality of 2D facial points across the sequence of images;
determining, by the at least one processor, a heart rate based blood circulation to facial blood vessels according to the frequency of the main hue;
determining, by the at least one processor, a phase of the heart rate based on the frequency of the main hue;
determining, by the at least one processor, an average period of the heart rate;
determining, by the at least one processor, phase differences based on a change in the phase across the sequence of images;
determining, by the at least one processor, an absolute difference from the average period based on the phase differences to estimate heart rate variability of the user; and
causing, by the at least one processor, to display with a screen an activity recommendation based at least on the heart rate variability.

11. The method of claim 10, further comprising:
determining, by the at least one processor, a power associated with each hue frequency in the spectral representation based on a convolution of a sine of the mean hue value and on a convolution of a cosine of the mean hue value;
wherein each hue frequency is associated with a distinct hue; and
determining, by the at least one processor, the frequency having a maximum power in the spectral representation;
wherein the phase is calculated across the sequence of images based on the convolution of the sine of the mean hue value and on the convolution of the cosine of the mean hue value for the frequency with the maximum power.

12. The method of claim 10, further comprising:
determining, by the at least one processor, a phase associated with each image in the sequence of images;
wherein the phase is based on an arc angle of a convolution of a sine of the mean hue value and on a convolution of a cosine of the mean hue value for the frequency of the main hue in the spectral representation; and
determining, by the at least one processor, the phase differences between each image in the sequence of images based on a difference between the phase associated with each image in the sequence of images.

13. The method of claim 10, further comprising:
determining, by the at least one processor, phase change intervals based on intervals of time between adjacent images in the sequence of images having threshold phase differences; and
wherein the threshold phase differences comprise the phase differences greater than about pi.

14. The method of claim 13, further comprising:
determining, by the at least one processor, relevant threshold phase change intervals based on the phase change intervals and the average period;
wherein the relevant threshold phase change intervals comprise intervals of the threshold phase change intervals having a duration between about one quarter of the average period and about twice the average period; and
determining, by the at least one processor, the absolute difference between the relevant threshold phase change intervals and the average period.

15. The method of claim 10, further comprising:
determining, by the at least one processor, a color value associated with each pixel of the plurality of 2D facial points in each image of the sequence of images;
determining, by the at least one processor, a separation between a brightness and a color from each color value; and
determining, by the processor, the hue based on the color of each pixel.

16. The method claim 10, wherein the moving window comprises one of a Hann window or a Gaussian window centered around zero.

17. The method of claim 10, wherein the image capture device is a camera of a mobile computing device.

18. The method of claim 10, wherein the plurality of 3D facial points comprise between about 10 and about 100 3D facial points.

19. A system, comprising:
a memory device;
a video capture device; and
a processing device;
wherein the processing device is configured to perform instructions stored in the memory device, the instructions comprising:
receiving, by a memory device, a sequence of images of a face of a user from the video capture device;
generating, by a processor, a three-dimensional (3D) model of the face in the sequence of images according to a face recognition algorithm;
determining a plurality of 3D facial points associated with one or more flat facial surfaces on the 3D model of the face;
projecting the plurality of 3D facial points onto a screen coordinate plane to produce a plurality of two-dimensional (2D) facial points;
wherein the screen coordinate plane comprises a set of coordinates relative to a screen in communication with the processor;

determining a hue of each pixel associated with each of the plurality of 2D facial points in each image of the sequence of images;

determining a mean hue value associated with each of the plurality of 2D facial points in each image of the sequence of images;

wherein the mean hue value is determined with a moving window;

determining a spectral representation of a variation in the mean hue value for each of the plurality of 2D facial points across the sequence of images;

determining a frequency of a main hue based on a largest weight of the variation in the mean hue value for each of the plurality of 2D facial points across the sequence of images;

determining a heart rate based blood circulation to facial blood vessels according to the frequency of the main hue;

determining a phase of the heart rate based on the frequency of the main hue;

determining an average period of the heart rate;

determining phase differences based on a change in the phase across the sequence of images;

determining an absolute difference from the average period based on the phase differences to estimate heart rate variability of the user; and causing to display with a screen an activity recommendation based at least on the heart rate variability.

20. The system of claim 19, wherein the video capture device is a camera of a mobile computing device.

* * * * *